Dec. 6, 1932.  H. S. BOONE  1,890,073
TEMPLATE HOLDING DEVICE
Filed April 2, 1929   2 Sheets-Sheet 2
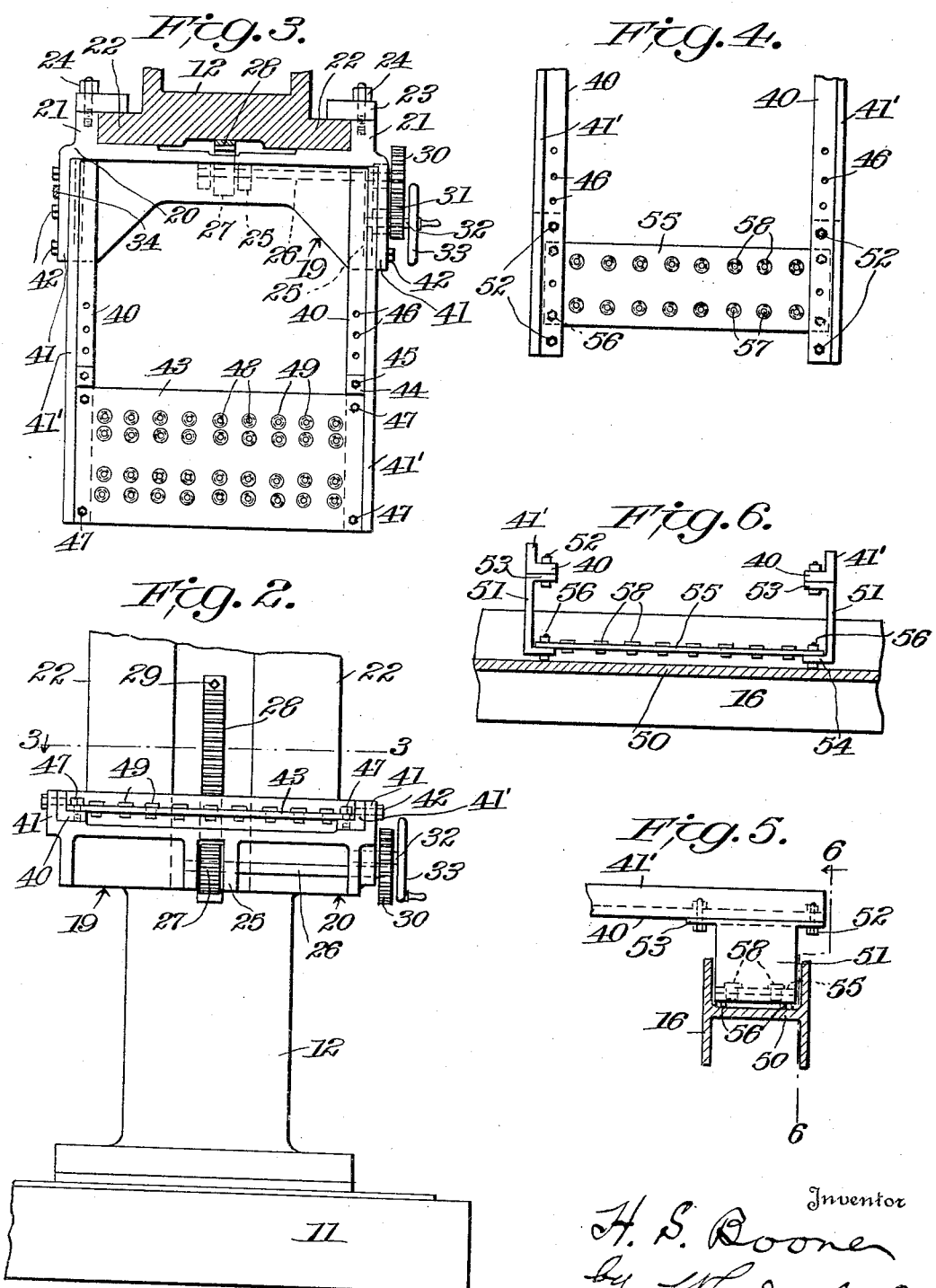

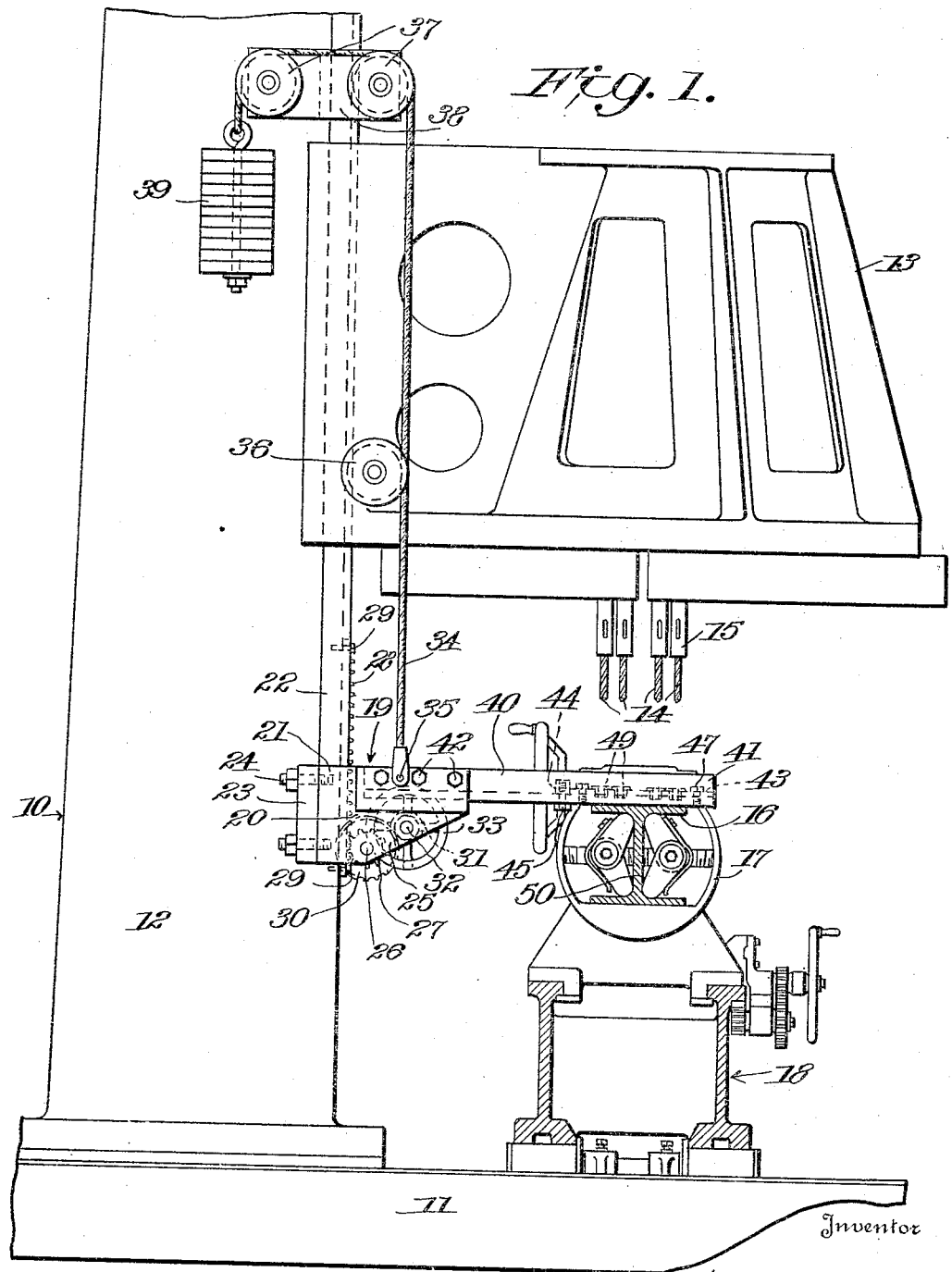

Patented Dec. 6, 1932

1,890,073

UNITED STATES PATENT OFFICE

HARRY SEARLES BOONE, OF POTTSTOWN, PENNSYLVANIA, ASSIGNOR TO McCLINTIC-MARSHALL COMPANY, OF POTTSTOWN, PENNSYLVANIA, A CORPORATION OF PENNSYLVANIA

TEMPLATE HOLDING DEVICE

Application filed April 2, 1929. Serial No. 351,843.

This invention relates to a template holding device in the nature of an accessory mechanism or attachment for a multiple spindle drill press, punch, or similar machine.

A prime object is to provide a construction wherein holes may be drilled in structural steel or other metallic members, without necessitating the marking of the centers on the structural members and wherein the drills are held so as to run true; that is, without lateral deviation, especially when initially encountering the work.

It is further aimed to provide a device of this character in which a template-carrying frame is mounted on the drill press for movement toward and away from the structural members to facilitate adjustment and positioning of the latter with respect to the template and to the drills.

An additional object is to provide novel means to mount a template for engagement with a side of a structural member, and with an attachment whereby a template is provided for engagement in the valley or channel of a structural member.

The more specific objects and advantages will become apparent from a consideration of the description following taken in connection with accompanying drawings, illustrating an operative embodiment, wherein:

Fig. 1 is a view fragmentarily showing a drill press equipped with my invention and associated with supporting and positioning means for a structural member;

Fig. 2 is a front elevation, fragmentarily showing a drill press with my improvements thereon, taken at a right angle to Fig. 1 and looking toward the left in the latter figure;

Fig. 3 is a horizontal sectional view taken on the line 3—3 of Fig. 2;

Fig. 4 is a plan view illustrating a modified form of template, for use in a channel, and supported from the arms of the frame;

Fig. 5 is a side elevation of the parts of Fig. 4 in connection with an H-beam; and Fig. 6 is a detail section taken on the line 6—6 of Fig. 5.

Referring specifically to the drawings, a conventional multiple spindle drill press is fragmentarily shown, as at 10, of which 11 is the base, 12 the column rising therefrom, and 13 the head which is vertically adjustable on said column and which carries a multiplicity of drills 14 mounted in spindles 15, which are rotated by mechanism on said column and head (not shown).

The drill press is shown in a position coacting with work such as an H-beam 16 which is held in a cradle 17 in a mounting and positioning means generally designated 18, which is partly supported on the base 11. This work-supporting mounting and positioning means may be similar to that disclosed in a pending application Serial No. 283,143, filed June 1, 1928, whereby the work, regardless of the specific shape of the beam, is positioned so that it may turn about a horizontal axis and may also be moved longitudinally to various positions.

In carrying out my invention, a frame 19 is provided which has a carriage portion at 20 having integral, laterally extending side members 21, which engage the side edges of a front plate of said drill press 12 formed by flanges 22. Bars or cleats 23 are bolted, as at 24, to the side members 21 and overlap the rear surfaces of the flanges 22.

Integral with the carriage 20 are bearing webs 25 in which a shaft 26 is journaled. A pinion 27 is keyed to the shaft 26 between the central bearing webs 25 and such pinion is in mesh with a vertical rack bar 28 which is bolted, as at 29, to the front face of the column 12 between flanges 22. Shaft 26 has a pinion 30 keyed thereto at one side thereof, which is in mesh with a smaller pinion 31 keyed to a short shaft 32 which is equipped with a hand wheel or crank 33, through the operation of which, the carriage 20 is caused to move upwardly or downwardly.

In order that said carriage 20 may remain in any vertical position, or elevation, to which it is adjusted, a cable or other flexible element 34 is fastened at 35 to the carriage, is trained over a guide pulley 36 journaled on the head 13, and is then trained over guide pulleys 37 journaled on a bracket 38 fastened in any suitable manner to the plate 22. The free end of cable 34 is equipped with a suitable counter-balancing weight device 39.

Extending forwardly from the carriage 20 and horizontally disposed, is a pair of arms 40 which are of angle form or L-shaped in cross section, being arranged with their vertical angles or flanges 41' abutting vertical flanges 41 integral with the carriage 20. Said arms 40 may be fastened in any desired manner to the carriage, as by means of welding or by screws or bolts as shown at 42, the latter passing through the flanges 41 and into the vertical flanges 41'.

At the forward portions, a removable template 43 rests on the horizontal flanges of arms 40 and at its ends is in abutment with the vertical flanges of such arms. Stop blocks 44 may be fastened at different locations along the arms 40 by means of screws 45 engaging threaded openings 46 in said arms. The inner side of the template 43 engages such stop blocks and securing bolts 47 may removably pass through the template and engage adjacent screw-threaded openings 46.

The template is provided with various openings 48 therethrough, each of which has a hard metal bushing 49 therein. The openings 48 accord with the position at which holes are to be drilled in the structural member 16, and hence are in vertical alinement with the drills 14 so that, as the drills 14 are lowered, they pass through the openings 48 in line therewith, thus accurately positioning the drills and preventing any deviation thereof from a true vertical position, which is especially essential when the drills initially engage the work or structural element, since the invention overcomes the necessity of previously marking or punching centers on the structural members.

The vertical adjustment of the carriage 20 particularly enables the template and its supporting parts to be moved out of the range of work being positioned by the cradle 17 and also to enable the work to be moved longitudinally from one drilling position to another, without interference by the improvements.

In cases where the web of the structural element 16, as at 50, is to be drilled, the additional parts shown in Figs. 4, 5 and 6 are used. These parts are of such nature as to extend into the channel of the structural member and consist of two side brackets 51 which, by means of bolts 52, are removably fastened against the under surfaces of the arms 40, such bolts being accommodated in the adjacent holes 46. Said brackets 51 have upper flanges 53, through which said bolts 52 pass, and they also have lower inwardly extending horizontal flanges 54 on which the ends of a template 55 rest, the latter being secured removably in place by means of bolts 56 passing through flanges 54 and said template. Template 55 has openings or holes 57 therethrough lined with hardened metal bushings 58, to accord with the position of the holes to be drilled in web 50 or the equivalent.

It will be realized that both templates 43 and 55 are relatively close to and preferably rest on the work, and that they may have their openings 48 and 57 arranged specially according to the particular structural member to be drilled, all depending upon the number and location of the openings to be drilled.

Various changes may be resorted to, provided they fall within the spirit and scope of the invention.

I claim:

1. In combination with a press of the class described having a column provided with vertical flanges and with a multiple spindle tool head movable thereon, a carriage independently of said head having portions overlapping the sides of said flanges, means on said portions overlapping the rear of the flanges, a rack on the column, gearing on the carriage in mesh with the rack and operable to move the carriage independently of and relatively to said head and to the work, counterbalancing means to maintain the carriage at different elevations, said carriage having side flanges, and template-mounting arms having flanges disposed in contact with said side flanges and a template adjustably secured to said arms.

2. In combination with a press of the class described having flanges, a multiple spindle head movable on the flanges, a carriage below and independent of said head having side portions engaging the flanges, cleats on the side portions overlapping the flanges, interengaging gearing having parts on the press proper and on the carriage operable to move the carriage along the press independently of said head, counterbalancing means to maintain the carriage at different elevations, a template, and means on the carriage adjustably mounting the template.

In testimony whereof I affix my signature.

HARRY SEARLES BOONE.